(12) United States Patent
Gerber et al.

(10) Patent No.: US 10,585,698 B2
(45) Date of Patent: Mar. 10, 2020

(54) TEMPLATE-DRIVEN MULTI-TENANT WORKFLOW PROCESSING

(71) Applicant: salesforce.com, inc., San Francisco, CA (US)

(72) Inventors: Thomas Gerber, Menlo Park, CA (US); Kit Pang Szeto, Sunnyvale, CA (US); Vitaly Gordon, Sunnyvale, CA (US); Ji Oh Yoo, San Francisco, CA (US); Shaun Senecal, Walnut Creek, CA (US); Gregory Rice, San Francisco, CA (US); Ka Hou Chan, Milpitas, CA (US)

(73) Assignee: salesforce.com, inc., San Francisco, CA (US)

(*) Notice: Subject to any disclaimer, the term of this patent is extended or adjusted under 35 U.S.C. 154(b) by 123 days.

(21) Appl. No.: 15/809,752

(22) Filed: Nov. 10, 2017

(65) Prior Publication Data
US 2019/0146830 A1    May 16, 2019

(51) Int. Cl.
*G06F 9/46* (2006.01)
*G06N 20/00* (2019.01)
(Continued)

(52) U.S. Cl.
CPC ............. *G06F 9/466* (2013.01); *G06F 12/00* (2013.01); *G06F 13/00* (2013.01); *G06N 20/00* (2019.01); *G06F 2209/503* (2013.01)

(58) Field of Classification Search
CPC ..... G06F 8/65; G06F 8/34; G06F 8/61; G06F 16/21; G06F 16/29; G06F 16/289; G06F 15/17306; G06F 11/1471; G06F 9/4843; G06F 9/5072; G06F 9/466; G06F 2209/503; G06N 20/00; H04L 67/10; H04L 67/1076; H04L 67/1097
See application file for complete search history.

(56) References Cited

U.S. PATENT DOCUMENTS

| 2011/0258630 A1* | 10/2011 | Fee ................ G06F 9/4843 718/101 |
| 2011/0264704 A1* | 10/2011 | Mehra .............. G06F 16/289 707/802 |

(Continued)

*Primary Examiner* — Tuan A Vu
(74) *Attorney, Agent, or Firm* — Holland & Hart LLP

(57) ABSTRACT

Methods, systems, and devices for multi-tenant workflow processing are described. In some cases, a cloud platform may utilize a set of pre-defined batch processes (e.g., workflow templates) and tenant-specific configurations for instantiating and executing tenant-specific batch processes for each tenant of a user. As such, the cloud platform may utilize common data process workflows for each tenant, where a configuration specifies tenant-specific information for the common data process workflows. The workflow templates may include a set of job definitions (e.g., actions for a server to execute) and a schedule defining the frequency for running the templates for a specific project. The configurations may indicate a tenant to execute the workflow templates for, and may include tenant-specific information to override default template information. The cloud platform or a designated server or server cluster may instantiate and execute workflows based on one or more combinations of configurations and indicated workflow templates.

18 Claims, 11 Drawing Sheets

(51) Int. Cl.
  *G06F 13/00*  (2006.01)
  *G06F 12/00*  (2006.01)

(56) References Cited

U.S. PATENT DOCUMENTS

| | | | |
|---|---|---|---|
| 2013/0007265 A1* | 1/2013 | Benedetti | H04L 67/1097 709/224 |
| 2013/0019235 A1* | 1/2013 | Tamm | G06F 8/65 717/170 |
| 2014/0019544 A1* | 1/2014 | Palmert | G06F 15/17306 709/204 |
| 2014/0195492 A1* | 7/2014 | Wilding | G06F 11/1471 707/684 |
| 2015/0089505 A1* | 3/2015 | Malaiyandisamy | G06F 9/5072 718/101 |
| 2015/0195344 A1* | 7/2015 | Surendran | H04L 67/10 709/201 |
| 2015/0333959 A1* | 11/2015 | Pathak | G06F 8/61 709/220 |
| 2015/0379429 A1* | 12/2015 | Lee | G06N 20/00 706/11 |
| 2016/0085772 A1* | 3/2016 | Vermeulen | G06F 16/21 707/615 |
| 2016/0323377 A1* | 11/2016 | Einkauf | H04L 67/1076 |
| 2016/0328661 A1* | 11/2016 | Reese | G06F 16/29 |
| 2017/0083292 A1* | 3/2017 | McLaughlan | G06F 8/34 |

\* cited by examiner

Continued...

TEMPLATE-DRIVEN MULTI-TENANT WORKFLOW PROCESSING

FIELD OF TECHNOLOGY

The present disclosure relates generally to database systems and data processing, and more specifically to template-driven multi-tenant workflow processing.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may employ machine learning to enhance predictive analytics for a user. The machine learning may include gathering data, preparing data, feature engineering, model training, and scoring steps, which may further include running complex data process workflows and jobs to accomplish such steps. For a single, multi-tenant application (e.g., a single user with a multi-tenant system), a data process workflow and job may be created, modified, and executed for each tenant based on a configuration for the corresponding tenant. However, in the case of multiple multi-tenant applications (e.g., multiple users with multi-tenant systems), the cloud platform may manage independent sets of data process workflows and jobs for each tenant and application combination, which may increase the complexity of the machine learning and data processing. Techniques are desired for efficiently handling data process workflows and jobs for a multiple user multi-tenant cloud platform.

DETAILED DESCRIPTION

In some database systems, a cloud platform may utilize data process workflows and jobs to improve recurring batch processing for a user. The cloud platform may utilize a multi-tenant database system (e.g., multiple users), where each user may in turn support multiple tenants. Data process workflows may be defined for each tenant of each user for one or more projects (e.g., modeling; scoring; extract, transform, and load (ETL); snapshot; new subscription; etc.). The users of the cloud platform may utilize a database server (e.g., a single server or a server cluster) for aggregating data and performing the batch processes associated with the data process workflows. The database server may implement a set of user-defined workflow templates for a set of tenants corresponding to that user. For example, the user may generate one or more workflow templates for a certain project, where each workflow template contains default scheduling information and job definitions that apply to all tenants of the user. Additionally, the user may define a set of configurations indicating tenant-specific information for workflows. The database server may apply a configuration to a workflow template, instantiating a tenant-specific batch process using the job definitions of the template and the tenant-specific information of the configuration. The user may define one or more configurations for each of its tenants. The database server may instantiate and execute workflows for each tenant based on the workflow templates and the configurations indicated by the user.

In some cases, the database server may utilize the default settings of a workflow template for a workflow execution. Alternatively, the database server may override the default information of the workflow templates with tenant-specific information from the configuration (e.g., different scheduling information, different job properties, etc.). The database server may instantiate and execute the workflows accordingly. Additionally, the database server may support multiple projects, where each project corresponds to a user and a specific set of workflow templates and configurations. As such, the database server may handle workflows for each project and perform machine learning across the multiple projects. Alternatively, the database server may perform machine learning on each project separately, or may perform machine learning by user (e.g., if the user maintains multiple projects).

Aspects of the disclosure are initially described in the context of an environment supporting an on-demand database service. Additionally, aspects of the disclosure are described through examples of data processing workflow platforms, a multiple user multi-tenant system, and a process flow. Aspects of the disclosure are further illustrated by and described with reference to apparatus diagrams, system diagrams, and flowcharts that relate to template-driven multi-tenant workflow processing.

Figure 1:
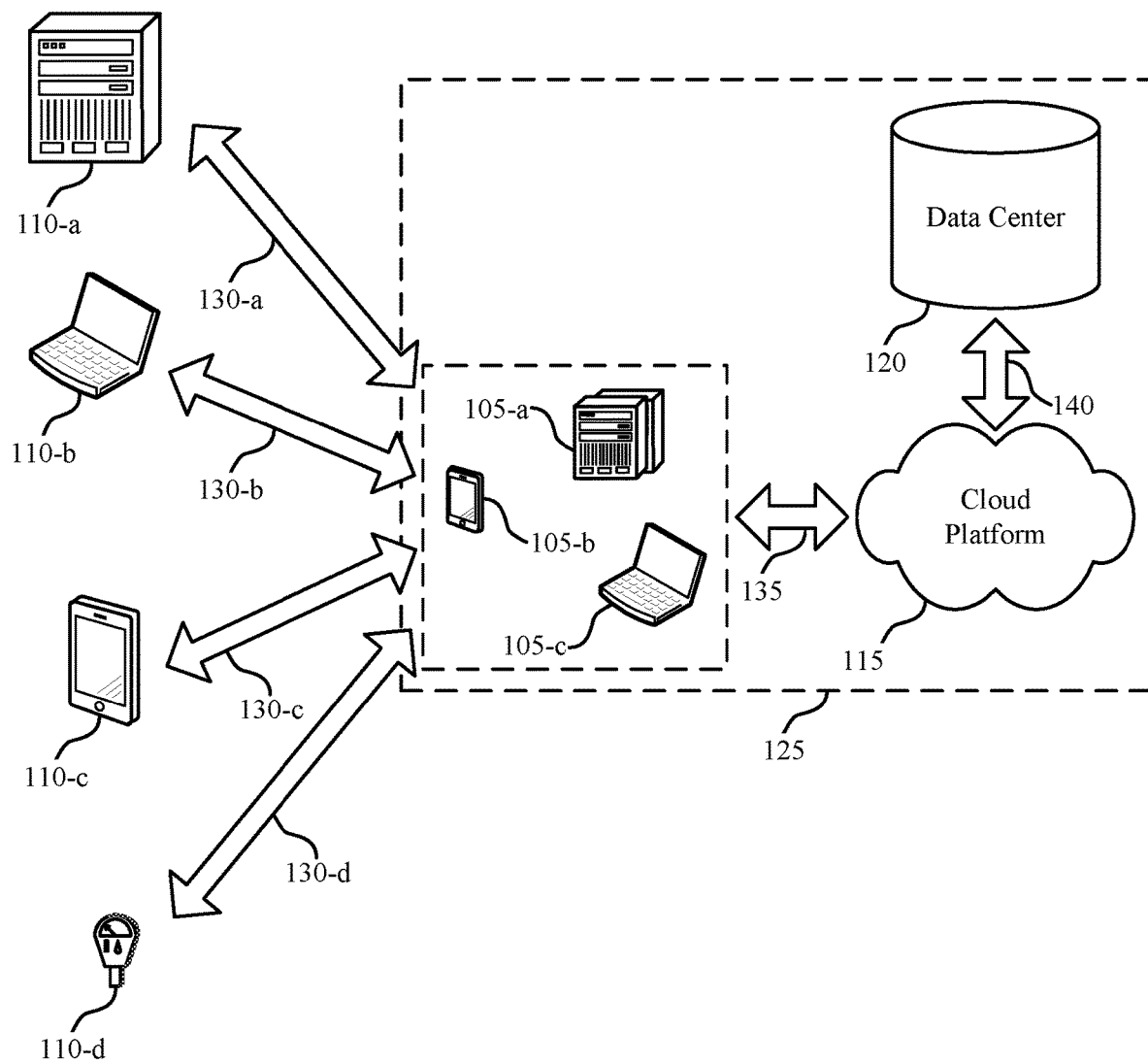
FIG. 1 illustrates an example of a system for managing a plurality of tenant-specific batch processes for a plurality of tenants at a multi-tenant database server that supports template-driven multi-tenant workflow processing in accordance with aspects of the present disclosure.

FIG. 1 illustrates an example of a system 100 for cloud computing that supports template-driven multi-tenant workflow processing in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a cloud platform 115 may utilize a machine learning model on data received from one or more cloud clients 105 to enhance interactions 130 between a contact 110 associated with a cloud client 105. For example, the machine learning may enable the cloud client 105 to predict a certain interaction 130 that the contact 110 intends to utilize based on historical data received and stored in the cloud platform 115 and a data center 120. The machine learning may include gathering and preparing data, feature engineering, model training, and scoring steps, which may include running complex data process workflows and batch jobs for one of the steps. When the cloud platform 115 includes multiple cloud clients 105 that each have multiple contacts 110 associated with them (i.e., a multiple user multi-tenant system), the complexity of the data process workflows and jobs may increase and scale with the number of cloud clients 105 and contacts 110 since a separate data process workflow and job may be created for each contact 110 associated with each cloud client 105.

In order to reduce the complexity of the machine learning and associated data process workflows and jobs, the cloud platform 115 may utilize a set of pre-defined batch processes, referred to as workflow templates (e.g., Workflow-Template files) and tenant-specific configurations (e.g., Run-Config files) for instantiating and executing tenant-specific batch processes for each contact 110 (e.g., a tenant) associated with each cloud client 105 (e.g., a user). As such, the cloud platform 115 may utilize common data process workflows shared across tenants, where a configuration specifies tenant-specific information for the common data process workflows. The workflow templates may include a set of batch job definitions (e.g., processes for a server to perform) and a schedule defining the frequency, order, or triggers for executing the workflows. The configurations may indicate a tenant and specific information for that tenant to override the default workflow template information. The cloud platform 115 or a designated server or server cluster operating as part of the cloud platform 115 may instantiate and execute a workflow based on a workflow template and one or more configurations implementing the workflow template.

Figure 2:
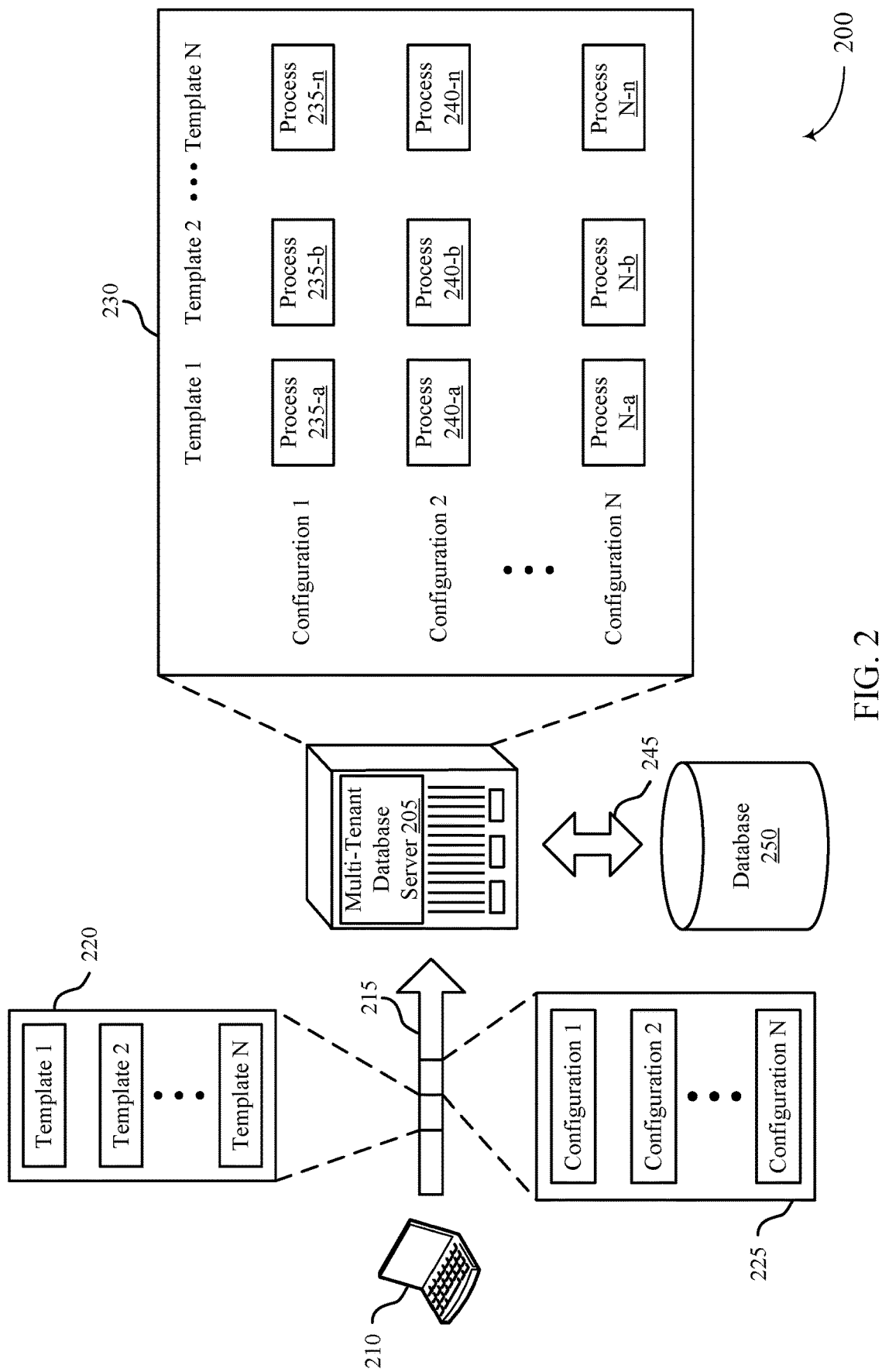
FIG. 2 illustrates an example of a data processing workflow platform that supports template-driven multi-tenant workflow processing in accordance with aspects of the present disclosure.

FIG. 2 illustrates an example of a data processing workflow platform 200 that supports template-driven multi-tenant workflow processing in accordance with various aspects of the present disclosure. Data processing workflow platform 200 may include a multi-tenant database server 205 and a user 210, where the user 210 may correspond to a user device associated with a specific user or user identifier (ID). The user 210 may transmit a set of templates 220 (e.g., pre-defined batch processes) and configurations 225 (e.g., tenant-specific configurations) for a project over an interaction 215. In some cases, user 210 may be an example of a cloud client 105 as described with reference to FIG. 1. Multi-tenant database server 205 may support multiple users 210, and each user 210 may support multiple tenants. Multi-tenant database server 205 may instantiate and execute a set of processes 230 based on a combination of the templates 220 and configurations 225.

In some cases, user 210 may transmit a set of templates 220 and configurations 225 associated with a project. For example, the project may include a logical group of templates 220 and configurations 225 for a specific purpose (e.g., modeling, scoring, ETL, snapshots, new subscriptions, etc.). Each template 220 may include a unique name within the project. Additionally, each template 220 may include a default schedule indicating a frequency for running the template 220 for the project. For example, the default schedule may indicate to execute the template 220 on a recurring schedule with specific fields, to execute the template once at a given time, or to never execute the template 220 (i.e., to disable the template 220). Further, each template 220 may include one or more job definitions with default properties (e.g., specifying a batch job for the multi-tenant database server 205 to perform). For example, a job definition may include a unique name for the job definition within the template 220, indications of other job definitions that the job definition depends upon, a job type (e.g., noop, CommandlineJob, JavaJob, SparkJob, etc.), and job properties (i.e., standard default properties for the job). The job may include a specific set of actions for multi-tenant database server 205 to execute. In some case, the job definition may belong to the template 220 it is included within and may not be referenced by other templates 220. Additionally, a template 220 may include multiple job definitions within it, where job definitions may have dependencies on other job definitions. In the case of multiple job definitions with dependencies, the jobs may be executed according to their priority in the dependencies. Alternatively, in the case of multiple job definitions without dependencies defined, the jobs may be executed in parallel and may end with a common job (e.g., a noop job) added by multi-tenant database server 205. In some cases, each template 220 may be a directed acyclic graph (DAG) which consists of a set of job definitions with a default schedule.

In addition to the templates 220, the user 210 may transmit a set of configurations 225 to indicate tenant-specific information for one or more tenants of user 210. In some cases, the number of configurations 225 may correspond to the number of tenants for user 210. Additionally or alternatively, the number of configurations 225 may be less than the number of tenants for user 210 (i.e., configurations are not defined for all tenants) or may be more than the number of tenants for user 210 (i.e., multiple configurations are defined for one tenant in the same project). The configurations 225 may include a unique name for the configuration within the project, an indication of the tenant (e.g., a tenant ID) to run the configuration for, and an optional set of overrides for one or more of the templates 220. For example, the set of overrides may include tenant-specific information that overrides the default settings of a template 220 (e.g., adjusting the schedule or job definition properties of the template 220). Additionally, each configuration 225 may indicate one or more templates 220 for the project. The multi-tenant database server 205 may utilize these template indications in order to determine the applicable template-configuration combinations when instantiating workflows.

Multi-tenant database server 205 may instantiate and execute a set of processes 230 (e.g., tenant-specific batch processes) based on combinations of the templates 220 and the configurations 225. The set of processes 230 may include a tenant-specific set of batch processes for each configuration 225. For example, a first configuration 225 may include an encompassing tenant-specific set of batch processes 235, and a second configuration 225 may include an encompassing tenant-specific set of batch processes 240. In some cases, the multi-tenant database server 205 may instantiate and execute N tenant-specific batch process for N configurations 225. In other cases, the multi-tenant database server 205 may instantiate and execute variable numbers of tenant-specific batch processes for the N configurations 225, where the number of processes depends on the indicated templates 220 in each configuration 225. Additionally, each configuration 225 may define specific settings for each template 220 within the encompassing tenant-specific batch process (e.g., through the override process described above). For example, the first configuration 225 may define an individual tenant-specific process 235-a for a first template 220, an individual tenant-specific process 235-b for a second template 220, and so forth up to an individual tenant-specific process 235-n for an N-th template. If an individual tenant-specific process is not defined in the encompassing tenant-specific batch process, multi-tenant database server 205 may utilize the default settings of the template 220. Additionally, if a template 220 does not apply for a specific tenant, the configuration 225 for that tenant may override the default schedule for the template 220 so that the processes associated with that template 220 do not occur. In some cases, if the workflow execution time is longer than the period defined for a recurring schedule (e.g., if it takes 10 minutes to finish execution of the workflow, but the schedule indicates a recurring 1 minute schedule), multi-tenant database server 205 may not execute multiple concurrent workflows for the template 220 (i.e., a next scheduled execution may start after the current one finishes).

In some cases, multi-tenant database server 205 may determine server processing resources for executing or computing the one or more jobs of each template 220. Multi-tenant database server 205 may schedule the workflows for each tenant according to the templates 220, the configurations 225, the determined server processing resources, or some combination thereof. Alternatively, the workflows may be triggered by an application programming interface (API) for user 210. In such cases, the workflows may be instantiated and executed based on a request message or a selection by user 210. Additionally, some workflows may fail (e.g., due to connection interference, failed queries, processing overload, etc.). Multi-tenant database server 205 may utilize retry mechanisms to reattempt a failed workflow process.

In one example, a first configuration 225 for a first tenant may include tenant-specific processes 235-a and 235-b, and a second configuration 225 for a second tenant may include tenant-specific processes 240-a and 240-b. Tenant-specific processes 235-a and 240-a may correspond to a first template 220 (e.g., having a first default schedule and first default job definition), and tenant-specific processes 235-b and 240-b may correspond to a second template 220 (e.g., having a second default schedule and second default job definition). The first configuration 225 may indicate that a workflow is instantiated for the first tenant using the default settings for the first template 220 in tenant-specific process 235-a, but may override a job property of the second template 220 in tenant-specific process 235-b in order to alter job dependencies defined in the default job description of the second template 220. Additionally or alternatively, the second configuration 225 may indicate that a workflow is instantiated for the second tenant such that the default schedule for the first template 220 is overridden in tenant-specific process 240-a to alter the recurring schedule and may override the default schedule for the second template 220 in tenant-specific process 240-b to "never," so that the second template 220 is not utilized for the second tenant. In some cases, both configurations 225 may be defined for a single tenant.

In some cases, user 210 may update, add, or delete one or more templates 220. Consequently, multi-tenant database server 205 may update the tenant-specific batch processes with the updated, added, or deleted template(s) 220. Additionally, user 210 may add one or more new tenants to the list of tenants associated with the user 210. As such, user 210 may add a number of configurations 225 for the new tenants, including tenant-specific settings for each of the indicated or defined templates 220. Multi-tenant database server 205 may instantiate and execute a new set of processes to perform workflows for the new tenant(s). Alternatively, user 210 may remove one or more tenants from the multi-tenant system. Subsequently, multi-tenant database server 205 may remove any configurations 225 and corresponding tenant-specific batch processes associated with the removed tenants from memory. When updating, adding, deleting, or modifying the templates 220, configurations 225, or the number of tenants, the multi-tenant database server 205 may perform an authentication process on the user 210. If the multi-tenant database server 205 verifies that the user 210 is authorized to edit and interact with the projects, multi-tenant database server 205 may perform the requested modifications (e.g., to the templates 220, configurations 225, or tenants).

Multi-tenant database server 205 may communicate with a database 250 (e.g., over a network connection 245) to store, retrieve, process, or perform additional actions on data records corresponding to or owned by user 210. Multi-tenant database server 205 may implement distributed computing clusters (e.g., MapReduce, Spark, etc.) to manage data record retrieval or processing. Multi-tenant database server 205 may monitor and generate alerts at the project level based on executing batch jobs or processing data records for the database 250. Additionally or alternatively, multi-tenant database server 205 may track and store execution statuses and execution logs during runtime. User 210 may view this tracked information to better understand the execution or batch processes.

In some cases, user 210 may define one or more additional projects for its tenants that utilize different templates 220 and configurations 225 specific to each project. Multi-tenant database server 205 may instantiate and execute tenant-specific batch processes for the additional project(s) similar to the steps described above. In some cases, multi-tenant database server 205 may perform machine learning for each project based on job definitions of one or more templates 220 for each of the projects. Additionally or alternatively, multi-tenant database server 205 may perform machine learning on data for each project independently based on data for just that specific project based on job definitions of one or more templates 220 for the project.

Figure 3:
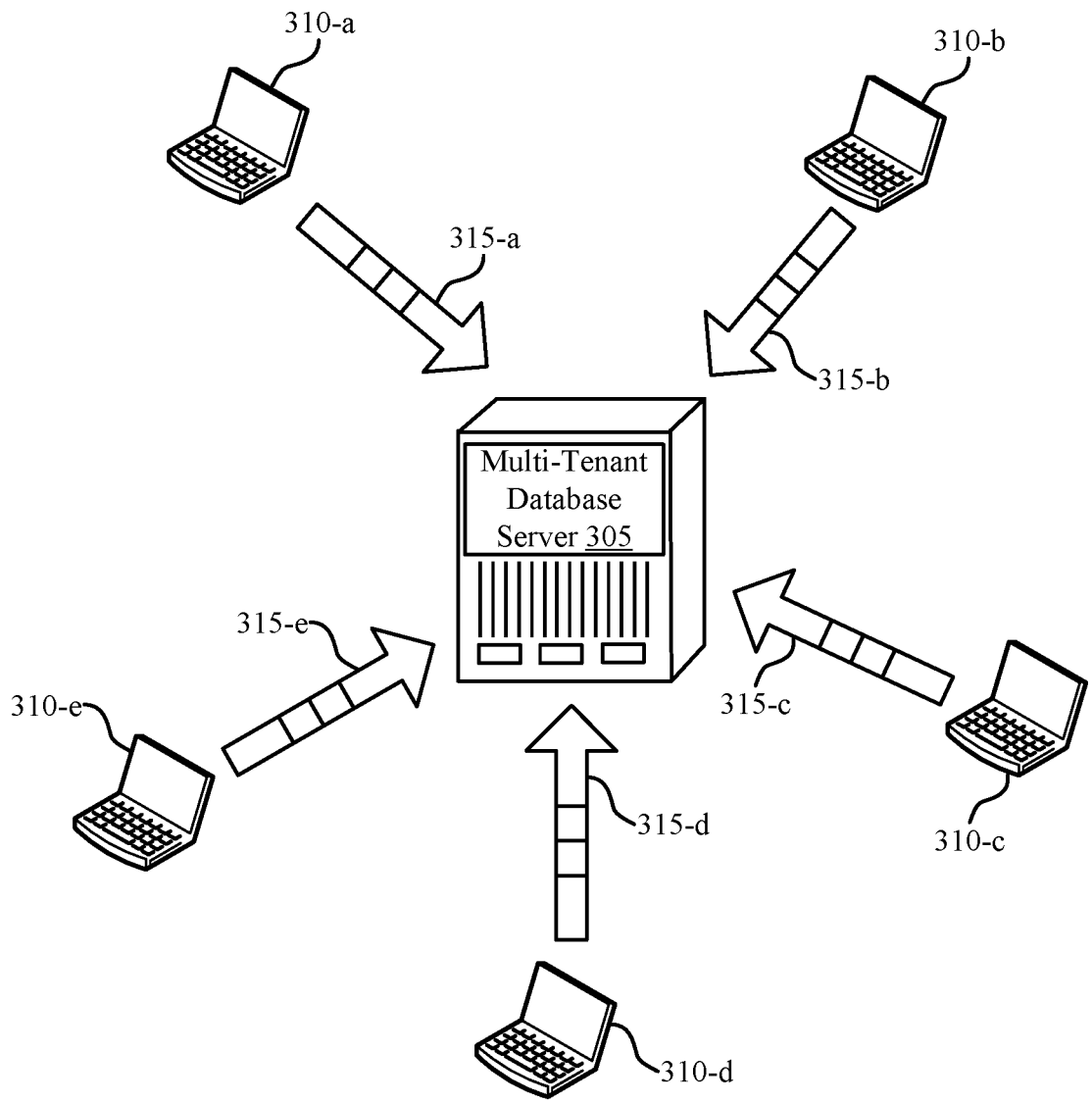
FIG. 3 illustrates an example of a multiple user multi-tenant system that supports template-driven multi-tenant workflow processing in accordance with aspects of the present disclosure.

FIG. 3 illustrates an example of a multiple user, multi-tenant system 300 that supports template-driven multi-tenant workflow processing in accordance with various aspects of the present disclosure. Multiple user, multi-tenant system 300 may include a multi-tenant database server 305 and multiple users 310, which may correspond to the multi-tenant database server 205 and user 210, respectively, as described with reference to FIG. 2. Each user 310 may transmit data (e.g., including pre-defined batch processes and tenant-specific configurations) to multi-tenant database server 305 over respective interactions 315.

In some cases, each user 310 may transmit a set of templates and configurations to multi-tenant database server 305 for one or more projects. Multi-tenant database server 305 may establish workflows for the tenants associated with each user 310, as described above with reference to FIG. 2. Multi-tenant database server 305 may serve multiple users 310 that each have multiple tenants, and may instantiate and execute tenant-specific batch processes for each defined configuration from each user 310. Each user may additionally define user-specific (but tenant-shared for that user) templates, where the templates may have similar structures with different default values depending on the user 310. Multi-tenant database server 305 may perform batch jobs more efficiently for each tenant of each user 310 based on the user-specific templates and tenant-specific configurations. Additionally, as multi-tenant database server 305 serves all of the users 310-a, 310-b, 310-c, 310-d, and 310-e, the server may schedule batch processes for different users 310 to better manage server cluster processing resources. For example, multi-tenant database server 305 may schedule jobs for user 310-a based on batch jobs for user 310-b, such that the processing overhead for the jobs may be kept below a certain processing resource or time resource threshold.

Multi-tenant database server 305 may perform machine learning based on one or more of the batch processes. In some cases, multi-tenant database server 305 may perform the machine learning independently for each user 310, such that the server updates any machine learned models or algorithms for a user 310 based on that user 310 alone. In other cases, multi-tenant database server 305 may perform machine learning across multiple users 310, so that the server may determine inferences and update models or algorithms for user 310-a based on processes performed for user 310-b.

Figure 4:
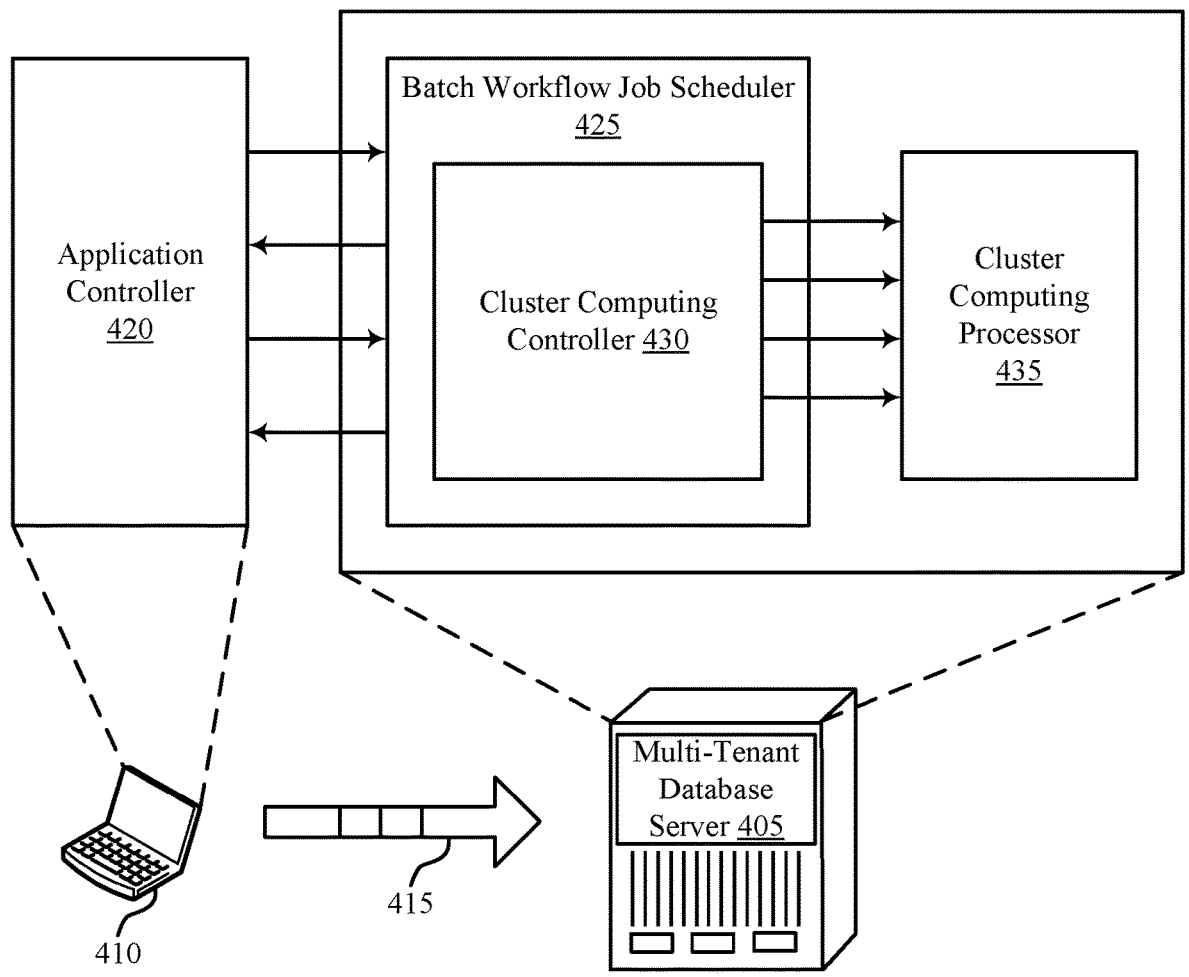
FIG. 4 illustrates an example of a workflow platform that supports template-driven multi-tenant workflow processing in accordance with aspects of the present disclosure.

FIG. 4 illustrates an example of a workflow platform 400 that supports template-driven multi-tenant workflow processing in accordance with various aspects of the present disclosure. Workflow platform 400 may include a multi-tenant database server 405 and user 410, which may be examples of corresponding multi-tenant database servers and users as described with reference to FIGS. 2 and 3. User 410 may transmit templates and configurations to multi-tenant database server 405 over an interaction 415 for one or more projects to establish workflows and tenant-specific batch processes as described above with reference to FIG. 2.

User 410 may include an application controller 420 that sends the user-defined templates and configurations to a batch workflow job scheduler 425. In some cases, batch workflow job scheduler 425 may be an example of an Azkaban workflow manager. Batch workflow job scheduler 425 may include a cluster computing controller 430. In some cases, cluster computing controller 430 may be an example of a Spark cluster controller. Batch workflow job scheduler 425 may receive the templates and configurations and schedule cluster computing controller 430 to process a set of data records according to the job indicated by the template.

Cluster computing processor 435 may receive the results of the jobs from clustering computing controller 430 and process the data accordingly. In some cases, cluster computing processor 435 may be an example of an Elastic MapReduce service. Cluster computing processor 435 may process and analyze the data from user 410 based on the templates and configurations assigned by user 410 through the application controller 420. This data or the templates or configurations may be modified, updated, or scheduled by batch workflow job scheduler 425 via cluster computing controller 430. In some cases, the projects containing the templates and configurations (e.g., corresponding to a specific user 410) may be defined based on a lifecycle of the cluster computing processor 435. The cluster computing processor 435 may perform auto-scaling of jobs, may queue the batch processes (e.g., using YARN queues), or may perform dynamic allocation of processing resources. The workflow service (e.g., including batch workflow job scheduler 425, cluster computing controller 430, and cluster computing processor 435) may automatically schedule the flow of jobs in order to stagger processing, in order to reduce the amount of processing resources used at any one time. This workflow service architecture may shift cluster awareness and precision controls (e.g., Sparkjob controls, execution time controls, etc.) from the user 410 to the backend multi-tenant database server 405.

Figure 5:
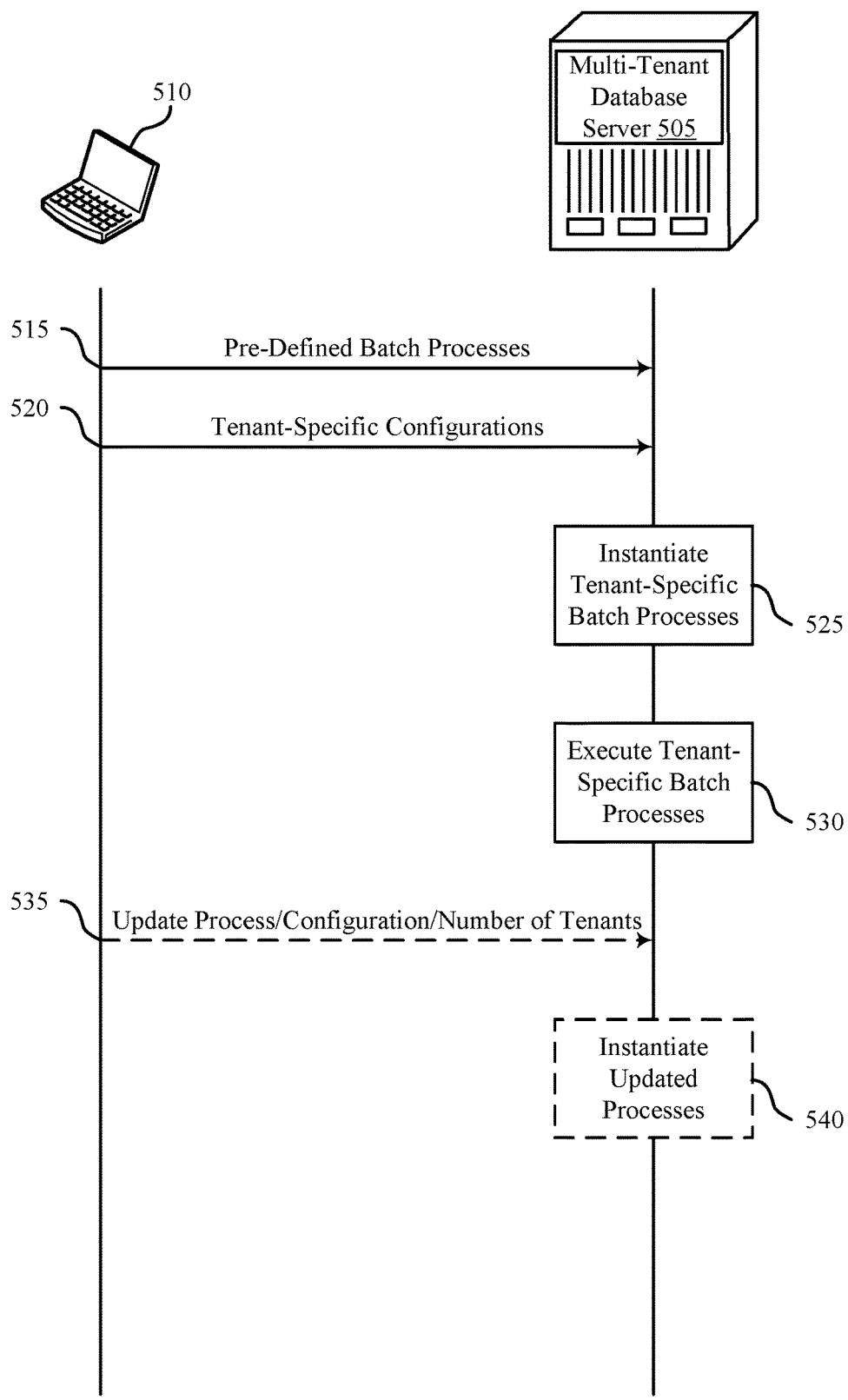
FIG. 5 illustrates an example of a process flow that supports template-driven multi-tenant workflow processing in accordance with aspects of the present disclosure.

FIG. 5 illustrates an example of a process flow 500 that supports template-driven multi-tenant workflow processing in accordance with various aspects of the present disclosure. Process flow 500 may include a multi-tenant database server 505 and a user 510, which may examples of multi-tenant database servers and users as described with reference to FIGS. 2 through 4. Process flow 500 may illustrate user 510 establishing data processing workflows with multi-tenant database server 505 for multiple tenants.

In the following description of the process flow 500, the operations between multi-tenant database server 505 and user 510 may be performed in different orders or at different times. Certain operations may also be left out of the process flow 500, or other operations may be added to the process flow 500.

At 515, multi-tenant database server 505 may receive a set of pre-defined batch processes (e.g., workflow templates) shared across tenants, where a pre-defined batch process includes default parameters for one or more compute jobs for the multi-tenant database server to execute. In some cases, the set of pre-defined batch processes may include a set of static DAGs, where a static DAG defines a sequence for the one or more compute jobs of a pre-defined batch process.

At 520, multi-tenant database server 505 may receive a plurality of tenant-specific configurations for executing one or more pre-defined batch processes of the set of pre-defined batch processes at runtime, where each tenant-specific configuration comprises execution parameters. In some cases, the execution parameters may override one or more of the default parameters for the pre-defined batch process. Additionally, each tenant-specific configuration may include a tenant ID. The received pre-defined batch processes and tenant-specific configurations may correspond to a first project.

At 525, multi-tenant database server 505 may instantiate the plurality of tenant-specific batch processes by applying each configuration of the plurality of tenant-specific configurations to the one or more pre-defined batch processes.

At 530, multi-tenant database server 505 may execute the plurality of tenant-specific batch processes based on the execution parameters for each tenant-specific configuration. In some cases, multi-tenant database server 505 may determine server processing resources for executing the one or more compute jobs of each pre-defined batch process. Accordingly, multi-tenant database server 505 may schedule execution of the plurality of tenant-specific batch processes based on the determined server processing resources. Alternatively, the tenant-specific batch processes may be triggered by an API call. In some cases, multi-tenant database server 505 may retrieve, from a database, one or more data records for processing at the multi-tenant database server. For example, multi-tenant database server 505 may implement a distributed computing cluster (e.g., MapReduce, Spark, etc.) to manage data record retrieval or processing. Additionally or alternatively, multi-tenant database server 505 may retry executing the plurality of tenant-specific batch processes for failed tenant-specific batch processing attempts.

At 535, user 510 may update the pre-defined processes, tenant-specific configurations, or the number of tenants. For example, multi-tenant database server 505 may receive an updated version of a first pre-defined batch process of the set of pre-defined batch processes shared across tenants. Additionally or alternatively, multi-tenant database server 505 may receive a new tenant-specific configuration indicating pre-defined batch processes of the set of pre-defined batch processes. Additionally or alternatively, multi-tenant database server 505 may receive a delete request indicating a tenant of the plurality of tenants. User 510 or multi-tenant database server 505 may perform an authentication procedure to verify that the user 510 has the authority to make edits and to interact with multi-tenant database server 505.

At 540, multi-tenant database server 505 may instantiate the updated processes as indicated at 535. For example, multi-tenant database server 505 may instantiate updated tenant-specific batch processes by applying each configuration of the plurality of tenant-specific configurations associated with the first pre-defined batch process to the updated version of the first pre-defined batch process. Additionally or alternatively, multi-tenant database server 505 may instantiate a number of new tenant-specific batch processes corresponding to a number of indicated pre-defined batch processes by applying the new tenant-specific configuration to each of the indicated pre-defined batch processes. Additionally or alternatively, multi-tenant database server 505 may identify one or more tenant-specific configurations corresponding to the tenant associated with the delete request, remove the one or more identified tenant-specific configurations from memory, and remove any tenant-specific batch processes from memory that correspond to a tenant-specific configuration of the identified one or more tenant-specific configurations.

In some cases, multi-tenant database server 505 may receive a second set of pre-defined batch processes shared across tenants and a second plurality of tenant-specific configurations corresponding to a second project. Consequently, multi-tenant database server 505 may schedule execution of tenant-specific batch processes for the second project based at least in part on executing the plurality of tenant-specific batch processes for the first project. Additionally, multi-tenant database server 505 may perform machine learning techniques across tenants or across projects.

Figure 6:
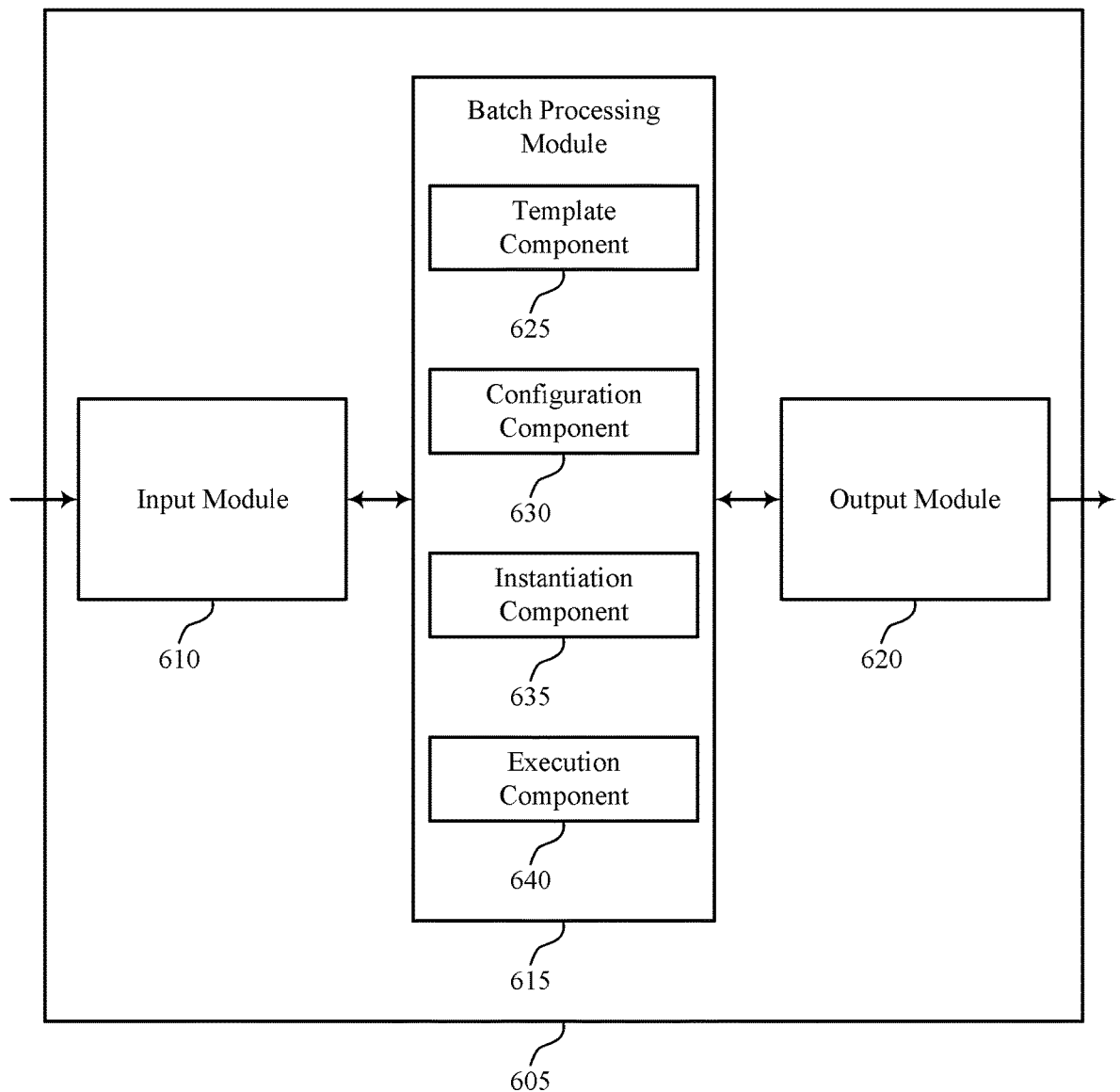
FIGS. 6 and 7 show block diagrams of a device that supports template-driven multi-tenant workflow processing in accordance with aspects of the present disclosure.

FIG. 6 shows a block diagram 600 of an apparatus 605 that supports template-driven multi-tenant workflow processing in accordance with aspects of the present disclosure. Apparatus 605 may include input module 610, batch processing module 615, and output module 620. Apparatus 605 may also include a processor. Each of these components may be in communication with one another (e.g., via one or more buses). In some cases, apparatus 605 may be an example of a user terminal, a database server, or a system containing multiple computing devices.

Batch processing module 615 may be an example of aspects of the batch processing module 815 described with reference to FIG. 8. Batch processing module 615 may also include template component 625, configuration component 630, instantiation component 635, and execution component 640.

Batch processing module 615 and/or at least some of its various sub-components may be implemented in hardware, software executed by a processor, firmware, or any combination thereof. If implemented in software executed by a processor, the functions of the batch processing module 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The batch processing module 615 and/or at least some of its various sub-components may be physically located at various positions, including being distributed such that portions of functions are implemented at different physical locations by one or more physical devices. In some examples, batch processing module 615 and/or at least some of its various sub-components may be a separate and distinct component in accordance with various aspects of the present disclosure. In other examples, batch processing module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Template component 625 may receive a set of pre-defined batch processes shared across tenants, where a pre-defined batch process includes default parameters for one or more compute jobs for a multi-tenant database server to execute. In some cases, the set of pre-defined batch processes includes a set of static DAGs, where a static DAG defines a sequence for the one or more compute jobs of a pre-defined batch process.

Configuration component 630 may receive a set of tenant-specific configurations for executing one or more pre-defined batch processes of the set of pre-defined batch processes at runtime, where each tenant-specific configuration includes execution parameters. In some cases, each tenant-specific configuration may additionally include a tenant ID.

Instantiation component 635 may instantiate a set of tenant-specific batch processes by applying each configuration of the set of tenant-specific configurations to the one or more pre-defined batch processes.

Execution component 640 may execute the set of tenant-specific batch processes at the multi-tenant database server based on the execution parameters for each tenant-specific configuration. In some cases, execution component 640 may receive an execution call from an API, where executing the set of tenant-specific batch processes is further based on the execution call. In some cases, the execution parameters override one or more of the default parameters for a pre-defined batch process.

Figure 7:
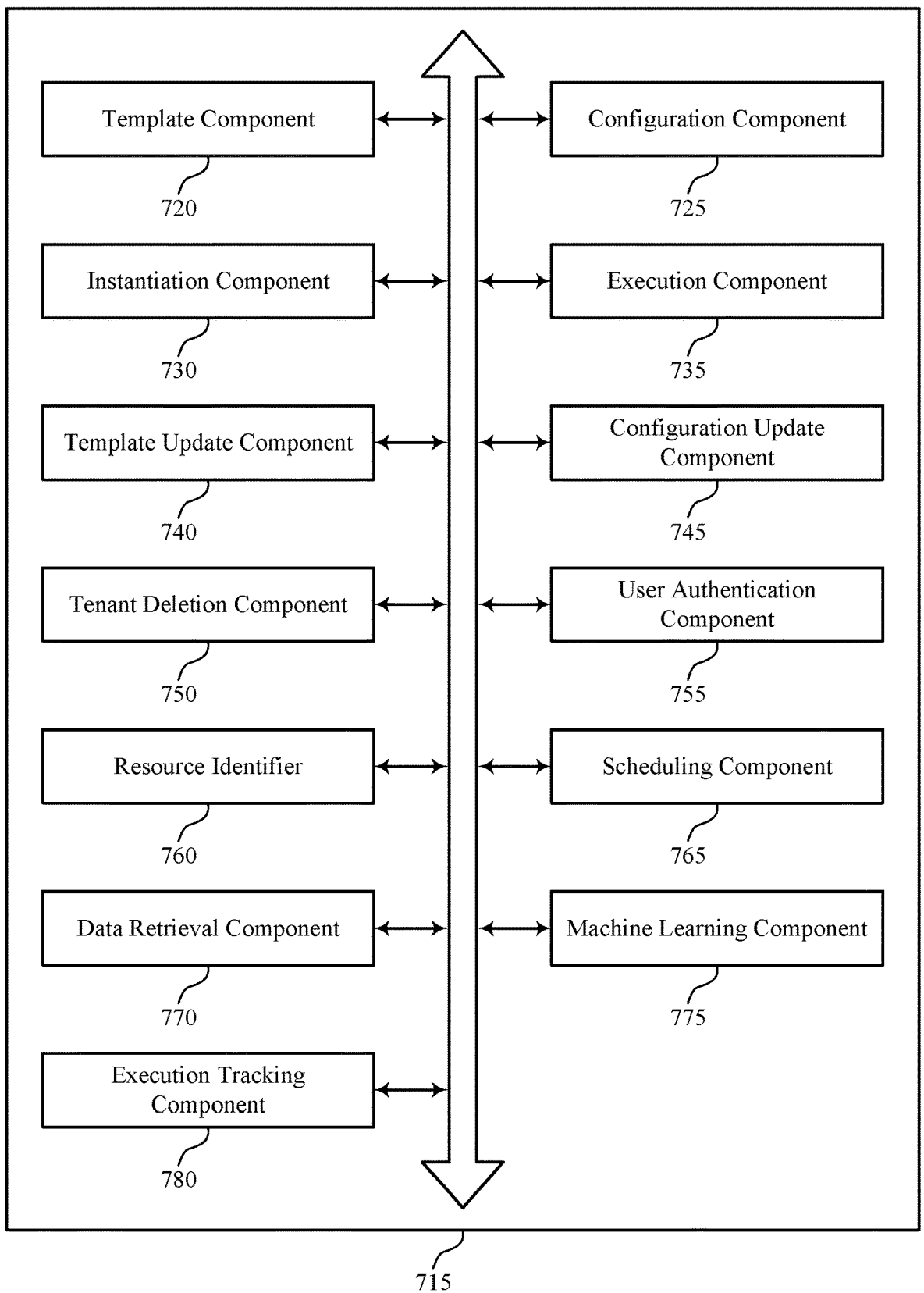

FIG. 7 shows a block diagram 700 of a batch processing module 715 that supports template-driven multi-tenant workflow processing in accordance with aspects of the present disclosure. The batch processing module 715 may be an example of aspects of a batch processing module 615 or 815 described with reference to FIGS. 6 and 8. The batch processing module 715 may include template component 720, configuration component 725, instantiation component 730, execution component 735, template update component 740, configuration update component 745, tenant deletion component 750, user authentication component 755, resource identifier 760, scheduling component 765, data retrieval component 770, machine learning component 775, and execution tracking component 780. Each of these modules may communicate, directly or indirectly, with one another (e.g., via one or more buses).

Template component 720 may receive a set of pre-defined batch processes shared across tenants, where a pre-defined batch process includes default parameters for one or more compute jobs for the multi-tenant database server to execute. In some cases, the set of pre-defined batch processes includes or is an example of a set of static DAGs, where a static DAG defines a sequence for the one or more compute jobs of a pre-defined batch process.

Configuration component 725 may receive a set of tenant-specific configurations for executing one or more pre-defined batch processes of the set of pre-defined batch processes at runtime, where each tenant-specific configuration includes execution parameters. In some cases, each tenant-specific configuration includes a tenant ID.

Instantiation component 730 may instantiate the set of tenant-specific batch processes by applying each configuration of the set of tenant-specific configurations to the one or more pre-defined batch processes.

Execution component 735 may execute the set of tenant-specific batch processes at the multi-tenant database server based on the execution parameters for each tenant-specific configuration. In some cases, execution component 735 may receive an execution call from an API, where executing the set of tenant-specific batch processes is further based on the execution call. In some cases, the execution parameters override one or more of the default parameters for the pre-defined batch process.

Template update component 740 may receive an updated version of a first pre-defined batch process of the set of pre-defined batch processes shared across tenants, and may instantiate updated tenant-specific batch processes by applying each configuration of the set of tenant-specific configurations associated with the first pre-defined batch process to the updated version of the first pre-defined batch process.

Configuration update component 745 may receive a new tenant-specific configuration indicating pre-defined batch processes of the set of pre-defined batch processes, and may instantiate a number of new tenant-specific batch processes corresponding to a number of indicated pre-defined batch processes by applying the new tenant-specific configuration to each of the indicated pre-defined batch processes.

Tenant deletion component 750 may receive a delete request indicating a tenant of the set of tenants, identify one or more tenant-specific configurations corresponding to the tenant, remove the one or more identified tenant-specific configurations from memory, and remove any tenant-specific batch processes from memory that correspond to a tenant-specific configuration of the identified one or more tenant-specific configurations.

User authentication component 755 may receive a modification request corresponding to a user identifier, where the modification request indicates a modification to the set of pre-defined batch processes, the set of tenant-specific configurations, or a combination thereof. User authentication component 755 may perform an authentication procedure on the user identifier to determine whether to perform the modification.

Resource identifier 760 may determine server processing resources for executing the one or more compute jobs of each pre-defined batch process. Scheduling component 765 may schedule execution of the set of tenant-specific batch processes based on the determined server processing resources. In some cases, the set of pre-defined batch processes and the set of tenant-specific configurations correspond to a first project. Template component 720 and configuration component 725 may receive a second set of pre-defined batch processes shared across tenants and a second set of tenant-specific configurations corresponding to a second project. In some cases, scheduling component 765 may schedule execution of tenant-specific batch processes for the second project based on executing the set of tenant-specific batch processes for the first project.

Data retrieval component 770 may retrieve, from a database, one or more data records for processing at the multi-tenant database server. In some cases, data retrieval component 770 may implement a distributed computing cluster to manage data record retrieval or processing. In some cases, the distributed computing cluster includes a MapReduce Cluster, a Spark Cluster, or a combination thereof. Machine learning component 775 may perform machine learning techniques across tenants or across projects.

In some cases, execution tracking component 780 may monitor execution of the set of tenant-specific batch processes for the first project. In other cases, execution tracking component 780 may store an execution status and a log of execution-related information at the multi-tenant database server.

Figure 8:
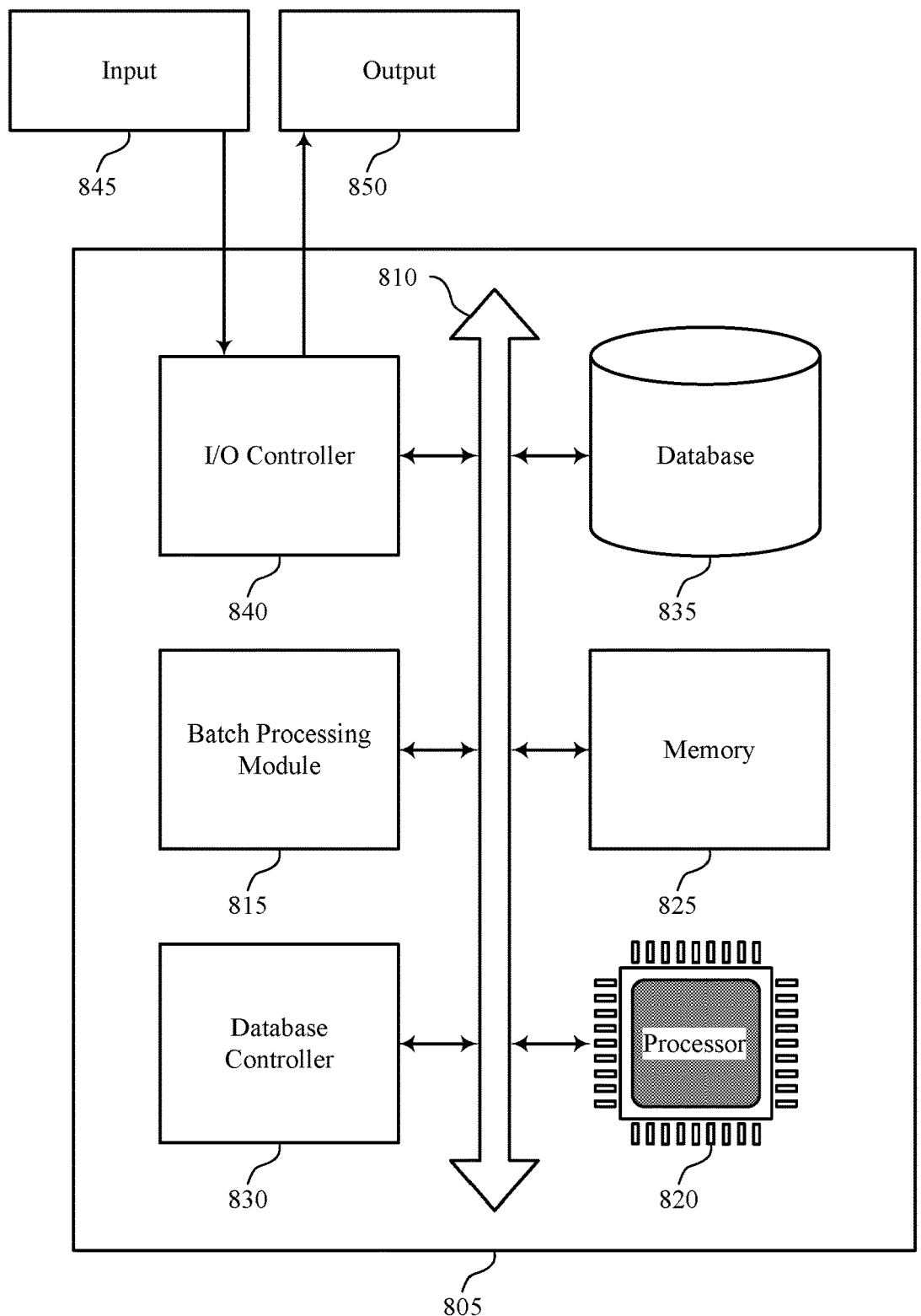
FIG. 8 illustrates a block diagram of a system including a database server that supports template-driven multi-tenant workflow processing in accordance with aspects of the present disclosure.

FIG. 8 shows a diagram of a system 800 including a device 805 that supports template-driven multi-tenant workflow processing in accordance with aspects of the present disclosure. Device 805 may be an example of or include the components of a database server or multi-tenant database server as described above, e.g., with reference to FIGS. 2 through 5. Device 805 may include components for bi-directional data communications including components for transmitting and receiving communications, including batch processing module 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting template-driven multi-tenant workflow processing).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
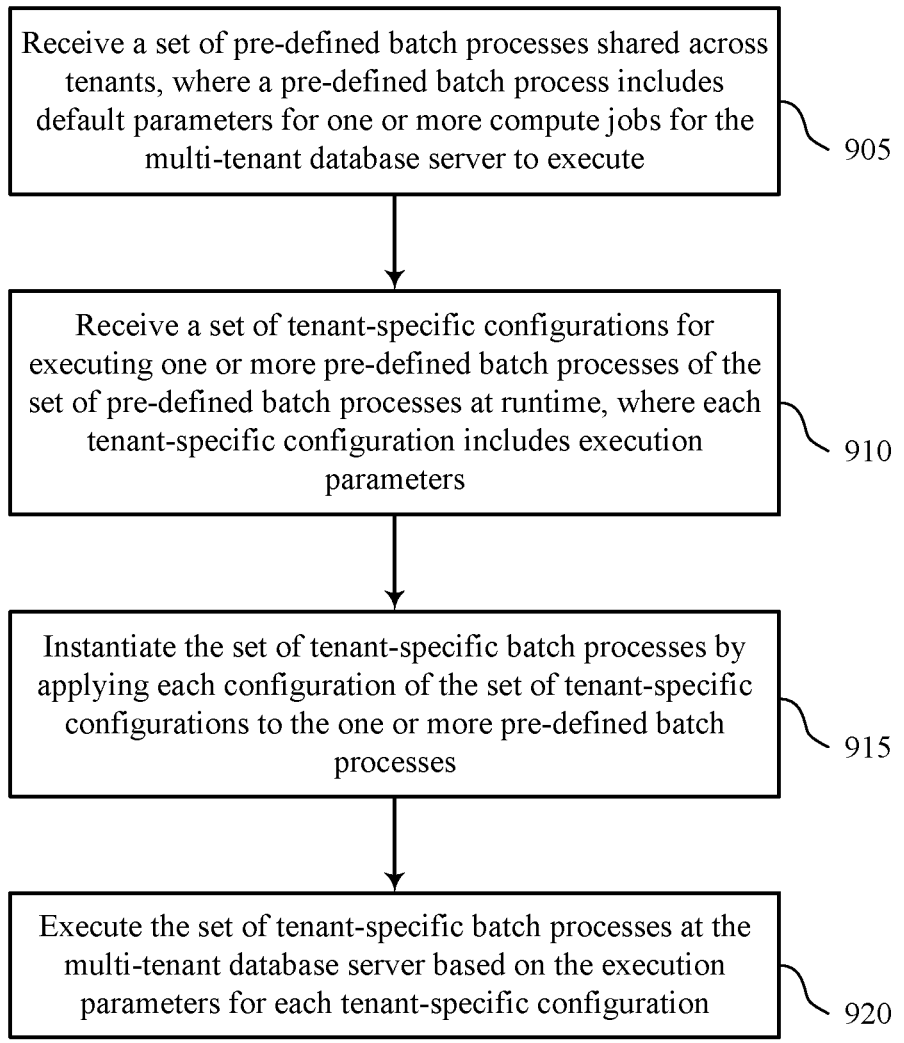
FIGS. 9 through 11 illustrate methods for template-driven multi-tenant workflow processing in accordance with aspects of the present disclosure.

FIG. 9 shows a flowchart illustrating a method 900 for template-driven multi-tenant workflow processing in accordance with aspects of the present disclosure. The operations of method 900 may be implemented by a database server (e.g., a multi-tenant database server) or its components as described herein. For example, the operations of method 900 may be performed by a batch processing module as described with reference to FIGS. 6 through 8. In some examples, a database server may execute a set of codes to control the functional elements of the device to perform the functions described below. Additionally or alternatively, the database server may perform aspects of the functions described below using special-purpose hardware.

At 905 the database server may receive a set of pre-defined batch processes shared across tenants, where a pre-defined batch process includes default parameters for one or more compute jobs for the database server to execute. The operations of 905 may be performed according to the methods described herein. In certain examples, aspects of the operations of 905 may be performed by a template component as described with reference to FIGS. 6 through 8.

At 910 the database server may receive multiple tenant-specific configurations for executing one or more pre-defined batch processes of the set of pre-defined batch processes at runtime, where each tenant-specific configuration includes execution parameters. The operations of 910 may be performed according to the methods described herein. In certain examples, aspects of the operations of 910 may be performed by a configuration component as described with reference to FIGS. 6 through 8.

At 915 the database server may instantiate multiple tenant-specific batch processes by applying each configuration of the tenant-specific configurations to the one or more pre-defined batch processes. The operations of 915 may be performed according to the methods described herein. In certain examples, aspects of the operations of 915 may be performed by an instantiation component as described with reference to FIGS. 6 through 8.

At 920 the database server may execute the tenant-specific batch processes based on the execution parameters for each tenant-specific configuration. The operations of 920 may be performed according to the methods described herein. In certain examples, aspects of the operations of 920 may be performed by an execution component as described with reference to FIGS. 6 through 8.

Figure 10:
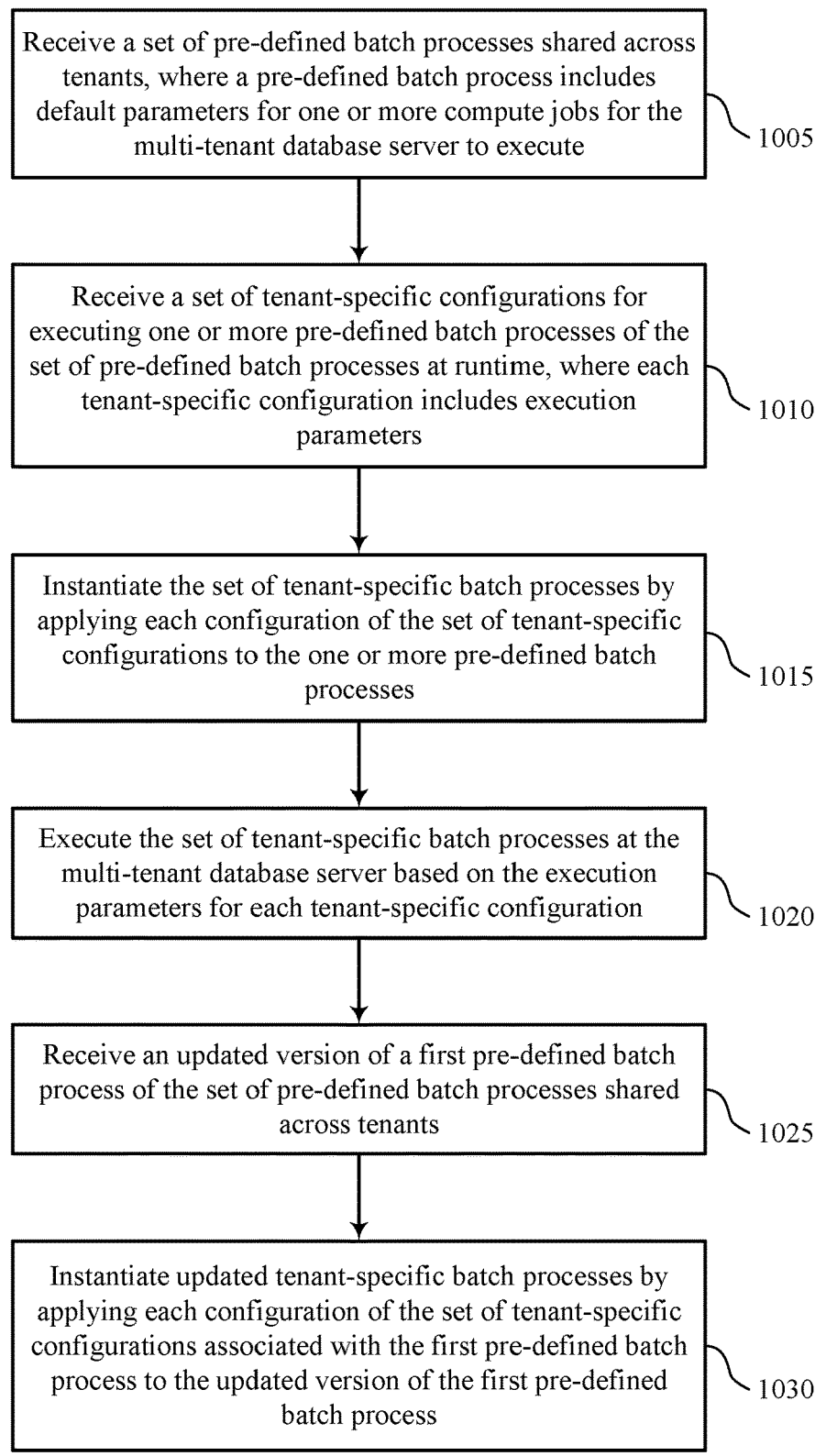

FIG. 10 shows a flowchart illustrating a method 1000 for template-driven multi-tenant workflow processing in accordance with aspects of the present disclosure. The operations of method 1000 may be implemented by a database server (e.g., a multi-tenant database server) or its components as described herein. For example, the operations of method 1000 may be performed by a batch processing module as described with reference to FIGS. 6 through 8. In some examples, a database server may execute a set of codes to control the functional elements of the device to perform the functions described below. Additionally or alternatively, the database server may perform aspects of the functions described below using special-purpose hardware.

At 1005 the database server may receive a set of pre-defined batch processes shared across tenants, where a pre-defined batch process includes default parameters for one or more compute jobs for the database server to execute. The operations of 1005 may be performed according to the methods described herein. In certain examples, aspects of the operations of 1005 may be performed by a template component as described with reference to FIGS. 6 through 8.

At 1010 the database server may receive multiple tenant-specific configurations for executing one or more pre-defined batch processes of the set of pre-defined batch processes at runtime, where each tenant-specific configuration includes execution parameters. The operations of 1010 may be performed according to the methods described herein. In certain examples, aspects of the operations of 1010 may be performed by a configuration component as described with reference to FIGS. 6 through 8.

At 1015 the database server may instantiate multiple tenant-specific batch processes by applying each configuration of the tenant-specific configurations to the one or more pre-defined batch processes. The operations of 1015 may be performed according to the methods described herein. In certain examples, aspects of the operations of 1015 may be performed by an instantiation component as described with reference to FIGS. 6 through 8.

At 1020 the database server may execute the tenant-specific batch processes based on the execution parameters for each tenant-specific configuration. The operations of 1020 may be performed according to the methods described herein. In certain examples, aspects of the operations of 1020 may be performed by an execution component as described with reference to FIGS. 6 through 8.

At 1025 the database server may receive an updated version of a first pre-defined batch process of the set of pre-defined batch processes shared across tenants. The operations of 1025 may be performed according to the methods described herein. In certain examples, aspects of the operations of 1025 may be performed by a template update component as described with reference to FIGS. 6 through 8.

At 1030 the database server may instantiate updated tenant-specific batch processes by applying each configuration of the tenant-specific configurations associated with the first pre-defined batch process to the updated version of the first pre-defined batch process. The operations of 1030 may be performed according to the methods described herein. In certain examples, aspects of the operations of 1030 may be performed by a template update component as described with reference to FIGS. 6 through 8.

Figure 11:
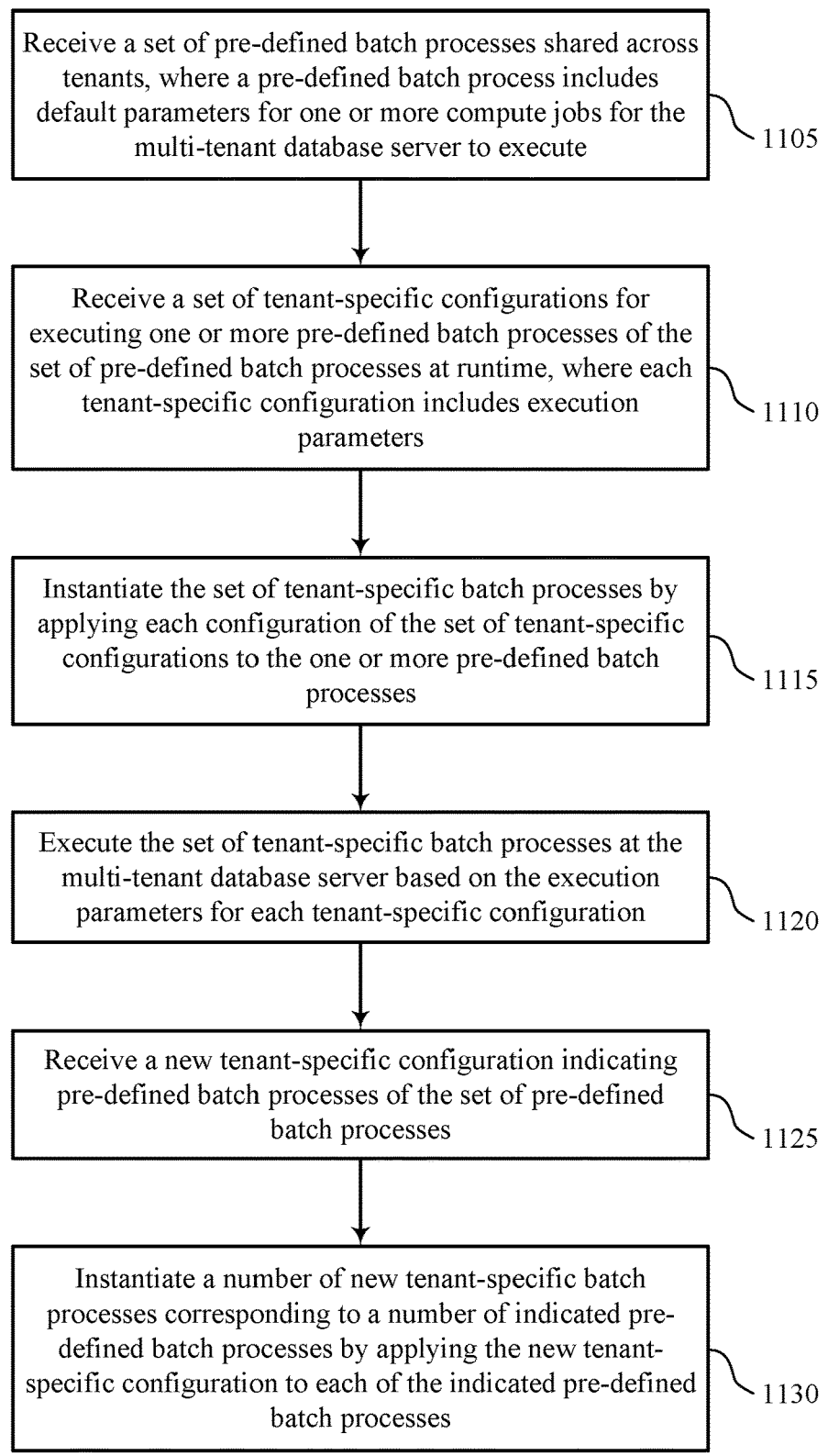

FIG. 11 shows a flowchart illustrating a method 1100 for template-driven multi-tenant workflow processing in accordance with aspects of the present disclosure. The operations of method 1100 may be implemented by a database server (e.g., a multi-tenant database server) or its components as described herein. For example, the operations of method 1100 may be performed by a batch processing module as described with reference to FIGS. 6 through 8. In some examples, a database server may execute a set of codes to control the functional elements of the device to perform the functions described below. Additionally or alternatively, the database server may perform aspects of the functions described below using special-purpose hardware.

At 1105 the database server may receive a set of pre-defined batch processes shared across tenants, where a pre-defined batch process includes default parameters for one or more compute jobs for the database server to execute. The operations of 1105 may be performed according to the methods described herein. In certain examples, aspects of the operations of 1105 may be performed by a template component as described with reference to FIGS. 6 through 8.

At 1110 the database server may receive multiple tenant-specific configurations for executing one or more pre-defined batch processes of the set of pre-defined batch processes at runtime, where each tenant-specific configuration includes execution parameters. The operations of 1110 may be performed according to the methods described herein. In certain examples, aspects of the operations of 1110 may be performed by a configuration component as described with reference to FIGS. 6 through 8.

At 1115 the database server may instantiate multiple tenant-specific batch processes by applying each configuration of the tenant-specific configurations to the one or more pre-defined batch processes. The operations of 1115 may be performed according to the methods described herein. In certain examples, aspects of the operations of 1115 may be performed by an instantiation component as described with reference to FIGS. 6 through 8.

At 1120 the database server may execute the tenant-specific batch processes based on the execution parameters for each tenant-specific configuration. The operations of 1120 may be performed according to the methods described herein. In certain examples, aspects of the operations of 1120 may be performed by an execution component as described with reference to FIGS. 6 through 8.

At 1125 the database server may receive a new tenant-specific configuration indicating pre-defined batch processes of the set of pre-defined batch processes. The operations of 1125 may be performed according to the methods described herein. In certain examples, aspects of the operations of 1125 may be performed by a configuration update component as described with reference to FIGS. 6 through 8.

At 1130 the database server may instantiate a number of new tenant-specific batch processes corresponding to a number of indicated pre-defined batch processes by applying the new tenant-specific configuration to each of the indicated pre-defined batch processes. The operations of 1130 may be performed according to the methods described herein. In certain examples, aspects of the operations of 1130 may be performed by a configuration update component as described with reference to FIGS. 6 through 8.

A method of managing a plurality of tenant-specific batch processes for a plurality of tenants at a multi-tenant database server is described. The method may include receiving a set of pre-defined batch processes shared across tenants, wherein a pre-defined batch process comprises default parameters for one or more compute jobs for the multi-tenant database server to execute, and receiving a plurality of tenant-specific configurations for executing one or more pre-defined batch processes of the set of pre-defined batch processes at runtime, wherein each tenant-specific configuration comprises execution parameters. The method may further include instantiating the plurality of tenant-specific batch processes by applying each configuration of the plurality of tenant-specific configurations to the one or more pre-defined batch processes, and executing the plurality of tenant-specific batch processes at the multi-tenant database server based at least in part on the execution parameters for each tenant-specific configuration.

An apparatus for managing a plurality of tenant-specific batch processes for a plurality of tenants at a multi-tenant database server is described. The apparatus may include a processor, memory in electronic communication with the processor, and instructions stored in the memory. The instructions may be operable to cause the processor to receive a set of pre-defined batch processes shared across tenants, wherein a pre-defined batch process comprises default parameters for one or more compute jobs for the multi-tenant database server to execute, and receive a plurality of tenant-specific configurations for executing one or more pre-defined batch processes of the set of pre-defined batch processes at runtime, wherein each tenant-specific configuration comprises execution parameters. The instructions may be further operable to cause the processor to instantiate the plurality of tenant-specific batch processes by applying each configuration of the plurality of tenant-specific configurations to the one or more pre-defined batch processes, and execute the plurality of tenant-specific batch processes at the multi-tenant database server based at least in part on the execution parameters for each tenant-specific configuration.

A non-transitory computer-readable medium for managing a plurality of tenant-specific batch processes for a plurality of tenants at a multi-tenant database server is described. The non-transitory computer-readable medium may include instructions operable to cause a processor to receive a set of pre-defined batch processes shared across tenants, wherein a pre-defined batch process comprises default parameters for one or more compute jobs for the multi-tenant database server to execute, and receive a plurality of tenant-specific configurations for executing one or more pre-defined batch processes of the set of pre-defined batch processes at runtime, wherein each tenant-specific configuration comprises execution parameters. The instructions may be further operable to cause the processor to instantiate the plurality of tenant-specific batch processes by applying each configuration of the plurality of tenant-specific configurations to the one or more pre-defined batch processes, and execute the plurality of tenant-specific batch processes at the multi-tenant database server based at least in part on the execution parameters for each tenant-specific configuration.

Some examples of the method, apparatus, and non-transitory computer-readable medium described above may further include processes, features, means, or instructions for receiving an updated version of a first pre-defined batch process of the set of pre-defined batch processes shared across tenants. Some examples of the method, apparatus, and non-transitory computer-readable medium described above may further include processes, features, means, or instructions for instantiating updated tenant-specific batch processes by applying each configuration of the plurality of tenant-specific configurations associated with the first pre-defined batch process to the updated version of the first pre-defined batch process.

Some examples of the method, apparatus, and non-transitory computer-readable medium described above may further include processes, features, means, or instructions for receiving a new tenant-specific configuration indicating pre-defined batch processes of the set of pre-defined batch processes. Some examples of the method, apparatus, and non-transitory computer-readable medium described above may further include processes, features, means, or instructions for instantiating a number of new tenant-specific batch processes corresponding to a number of indicated pre-defined batch processes by applying the new tenant-specific configuration to each of the indicated pre-defined batch processes.

Some examples of the method, apparatus, and non-transitory computer-readable medium described above may further include processes, features, means, or instructions for receiving a delete request indicating a tenant of the plurality of tenants. Some examples of the method, apparatus, and non-transitory computer-readable medium described above may further include processes, features, means, or instructions for identifying one or more tenant-specific configurations corresponding to the tenant. Some examples of the method, apparatus, and non-transitory computer-readable medium described above may further include processes, features, means, or instructions for removing the one or more identified tenant-specific configurations from memory. Some examples of the method, apparatus, and non-transitory computer-readable medium described above may further include processes, features, means, or instructions for removing any tenant-specific batch processes from memory that correspond to a tenant-specific configuration of the identified one or more tenant-specific configurations.

Some examples of the method, apparatus, and non-transitory computer-readable medium described above may further include processes, features, means, or instructions for receiving a modification request corresponding to a user identifier, wherein the modification request indicates a modification to the set of pre-defined batch processes, the plurality of tenant-specific configurations, or a combination thereof. Some examples of the method, apparatus, and non-transitory computer-readable medium described above may further include processes, features, means, or instructions for performing an authentication procedure on the user identifier to determine whether to perform the modification.

Some examples of the method, apparatus, and non-transitory computer-readable medium described above may further include processes, features, means, or instructions for determining server processing resources for executing the one or more compute jobs of each pre-defined batch process. Some examples of the method, apparatus, and non-transitory computer-readable medium described above may further include processes, features, means, or instructions for scheduling execution of the plurality of tenant-specific batch processes based at least in part on the determined server processing resources.

Some examples of the method, apparatus, and non-transitory computer-readable medium described above may further include processes, features, means, or instructions for receiving an execution call from an API, wherein executing the plurality of tenant-specific batch processes may be further based at least in part on the execution call.

In some examples of the method, apparatus, and non-transitory computer-readable medium described above, executing the plurality of tenant-specific batch processes comprises retrieving, from a database, one or more data records for processing at the multi-tenant database server.

Some examples of the method, apparatus, and non-transitory computer-readable medium described above may further include processes, features, means, or instructions for implementing a distributed computing cluster to manage data record retrieval or processing. In some examples of the method, apparatus, and non-transitory computer-readable medium described above, the distributed computing cluster comprises a MapReduce Cluster, a Spark Cluster, or a combination thereof.

In some examples of the method, apparatus, and non-transitory computer-readable medium described above, the set of pre-defined batch processes and the plurality of tenant-specific configurations correspond to a first project. Some examples of the method, apparatus, and non-transitory computer-readable medium described above may further include processes, features, means, or instructions for receiving a second set of pre-defined batch processes shared across tenants and a second plurality of tenant-specific configurations corresponding to a second project. Some examples of the method, apparatus, and non-transitory computer-readable medium described above may further include processes, features, means, or instructions for scheduling execution of tenant-specific batch processes for the second project based at least in part on executing the plurality of tenant-specific batch processes for the first project.

Some examples of the method, apparatus, and non-transitory computer-readable medium described above may further include processes, features, means, or instructions for performing machine learning techniques across tenants or across projects. Some examples of the method, apparatus, and non-transitory computer-readable medium described above may further include processes, features, means, or instructions for monitoring execution of the plurality of tenant-specific batch processes for the first project.

In some examples of the method, apparatus, and non-transitory computer-readable medium described above, the execution parameters override one or more of the default parameters for the pre-defined batch process.

Some examples of the method, apparatus, and non-transitory computer-readable medium described above may further include processes, features, means, or instructions for storing an execution status and a log of execution-related information at the multi-tenant database server.

In some examples of the method, apparatus, and non-transitory computer-readable medium described above, the set of pre-defined batch processes comprises a set of static DAGs, wherein a static DAG defines a sequence for the one or more compute jobs of a pre-defined batch process.

In some examples of the method, apparatus, and non-transitory computer-readable medium described above, each tenant-specific configuration comprises a tenant ID.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing a plurality of data processing jobs for a plurality of tenants at a multi-tenant database server, comprising:
receiving a set of pre-defined schedules for data processing jobs shared across tenants, wherein a pre-defined schedule for data processing jobs comprises default parameters for one or more compute jobs for the multi-tenant database server to execute;
receiving a plurality of tenant-specific configurations for executing one or more pre-defined schedules for data processing jobs of the set of pre-defined schedules for data processing jobs at runtime, wherein each tenant-specific configuration comprises execution parameters for a respective tenant of the plurality of tenants, and wherein the set of pre-defined schedules for data processing lobs and the plurality of tenant-specific configurations correspond to a first project;
instantiating a plurality of tenant-specific sets of batch processes by applying each configuration of the plurality of tenant-specific configurations to the one or more pre-defined schedules for data processing jobs, wherein a respective tenant-specific set of batch processes of the plurality of tenant-specific sets of batch processes corresponds to a respective tenant and encompasses each data processing job of the one or more pre-defined schedules of data processing jobs for the respective tenant;
executing the plurality of tenant-specific sets of batch processes at the multi-tenant database server based at least in part on the execution parameters for each tenant-specific configuration;
receiving a second set of pre-defined schedules for data processing lobs shared across tenants and a second plurality of tenant-specific configurations corresponding to a second project;
scheduling execution of tenant-specific sets of batch processes for the second project based at least in part on executing the plurality of tenant-specific sets of batch processes for the first project; and
performing machine learning techniques across tenants or across projects.

2. The method of claim 1, further comprising:
receiving an updated version of a first pre-defined schedule for data processing jobs of the set of pre-defined schedules for data processing jobs shared across tenants; and
instantiating updated tenant-specific sets of batch processes by applying each configuration of the plurality of tenant-specific configurations associated with the first pre-defined schedule for data processing jobs to the updated version of the first pre-defined schedule for data processing jobs.

3. The method of claim 1, further comprising:
receiving a new tenant-specific configuration indicating pre-defined schedules for data processing jobs of the set of pre-defined schedules for data processing jobs; and
instantiating a number of new tenant-specific sets of batch processes corresponding to a number of indicated pre-defined schedules for data processing jobs by applying the new tenant-specific configuration to each of the indicated pre-defined schedules for data processing jobs.

4. The method of claim 1, further comprising:
receiving a delete request indicating a tenant of the plurality of tenants;
identifying one or more tenant-specific configurations corresponding to the tenant;
removing the one or more identified tenant-specific configurations from memory; and
removing any tenant-specific sets of batch processes from memory that correspond to a tenant-specific configuration of the identified one or more tenant-specific configurations.

5. The method of claim 1, further comprising:
receiving a modification request corresponding to a user identifier, wherein the modification request indicates a modification to the set of pre-defined schedules for data processing jobs, the plurality of tenant-specific configurations, or a combination thereof; and
performing an authentication procedure on the user identifier to determine whether to perform the modification.

6. The method of claim 1, further comprising:
determining server processing resources for executing the one or more compute jobs of each pre-defined schedule for data processing jobs based at least in part on an auto-scaling configuration for the data processing jobs, a queue of the data processing jobs, a dynamic allocation of the server processing resources, a staggering configuration for executing the one or more compute jobs at different times, or a combination thereof.

7. The method of claim 6, further comprising:
scheduling execution of the plurality of tenant-specific sets of batch processes based at least in part on the determined server processing resources.

8. The method of claim 1, further comprising:
receiving an execution call from an application programming interface (API), wherein executing the plurality of tenant-specific sets of batch processes is further based at least in part on the execution call.

9. The method of claim 1, wherein executing the plurality of tenant-specific sets of batch processes comprises:
retrieving, from a database, one or more data records for processing at the multi-tenant database server.

10. The method of claim 9, further comprising:
implementing a distributed computing cluster to manage data record retrieval or processing.

11. The method of claim 10, wherein the distributed computing cluster comprises a MapReduce Cluster, a Spark Cluster, or a combination thereof.

12. The method of claim 1, further comprising:
monitoring execution of the plurality of tenant-specific sets of batch processes for the first project.

13. The method of claim 1, wherein the execution parameters override one or more of the default parameters for the pre-defined schedule for data processing jobs.

14. The method of claim 1, further comprising:
storing an execution status and a log of execution-related information at the multi-tenant database server.

15. The method of claim 1, wherein the set of pre-defined schedules for data processing jobs comprises a set of static directed acyclic graphs (DAGs), wherein a static DAG defines a sequence for the one or more compute jobs of a pre-defined schedule for data processing jobs.

16. The method of claim 1, wherein each tenant-specific configuration comprises a tenant identifier (ID).

17. An apparatus for managing a plurality of data processing jobs for a plurality of tenants at a multi-tenant database server, comprising:
a processor;
memory in electronic communication with the processor; and
instructions stored in the memory and executable by the processor to cause the apparatus to:
receive a set of pre-defined schedules for data processing jobs shared across tenants, wherein a pre-defined schedule for data processing jobs comprises default parameters for one or more compute jobs for the multi-tenant database server to execute;
receive a plurality of tenant-specific configurations for executing one or more pre-defined schedules for data processing jobs of the set of pre-defined schedules for data processing jobs at runtime, wherein each tenant-specific configuration comprises execution parameters for a respective tenant of the plurality of tenants, and wherein the set of pre-defined schedules for data processing lobs and the plurality of tenant-specific configurations correspond to a first project;
instantiate a plurality of tenant-specific sets of batch processes by applying each configuration of the plurality of tenant-specific configurations to the one or more pre-defined schedules for data processing jobs, wherein a respective tenant-specific set of batch processes of the plurality of tenant-specific sets of batch processes corresponds to a respective tenant and encompasses each data processing job of the one or more pre-defined schedules of data processing jobs for the respective tenant;
execute the plurality of tenant-specific sets of batch processes at the multi-tenant database server based at least in part on the execution parameters for each tenant-specific configuration;
receive a second set of pre-defined schedules for data processing jobs shared across tenants and a second plurality of tenant-specific configurations corresponding to a second project;
schedule execution of tenant-specific sets of batch processes for the second project based at least in part on executing the plurality of tenant-specific sets of batch processes for the first project; and
perform machine learning techniques across tenants or across projects.

18. A non-transitory computer-readable medium storing code for managing a plurality of data processing jobs for a plurality of tenants at a multi-tenant database server, the code comprising instructions executable by a processor to:
receive a set of pre-defined schedules for data processing jobs shared across tenants, wherein a pre-defined schedule for data processing jobs comprises default parameters for one or more compute jobs for the multi-tenant database server to execute;
receive a plurality of tenant-specific configurations for executing one or more pre-defined schedules for data processing jobs of the set of pre-defined schedules for data processing jobs at runtime, wherein each tenant-specific configuration comprises execution parameters for a respective tenant of the plurality of tenants, and wherein the set of pre-defined schedules for data processing lobs and the plurality of tenant-specific configurations correspond to a first project;
instantiate a plurality of tenant-specific sets of batch processes by applying each configuration of the plurality of tenant-specific configurations to the one or more pre-defined schedules for data processing jobs, wherein a respective tenant-specific set of batch processes of the plurality of tenant-specific sets of batch processes corresponds to a respective tenant and encompasses each data processing job of the one or more pre-defined schedules of data processing jobs for the respective tenant;
execute the plurality of tenant-specific sets of batch processes at the multi-tenant database server based at least in part on the execution parameters for each tenant-specific configuration;
receive a second set of pre-defined schedules for data processing lobs shared across tenants and a second plurality of tenant-specific configurations corresponding to a second project;
schedule execution of tenant-specific sets of batch processes for the second project based at least in part on executing the plurality of tenant-specific sets of batch processes for the first project; and
perform machine learning techniques across tenants or across projects.

* * * * *